April 22, 1969     W. ALBRECHT ET AL     3,440,019
POLYCONDENSATION REACTOR
Filed June 1, 1965     Sheet 1 of 2
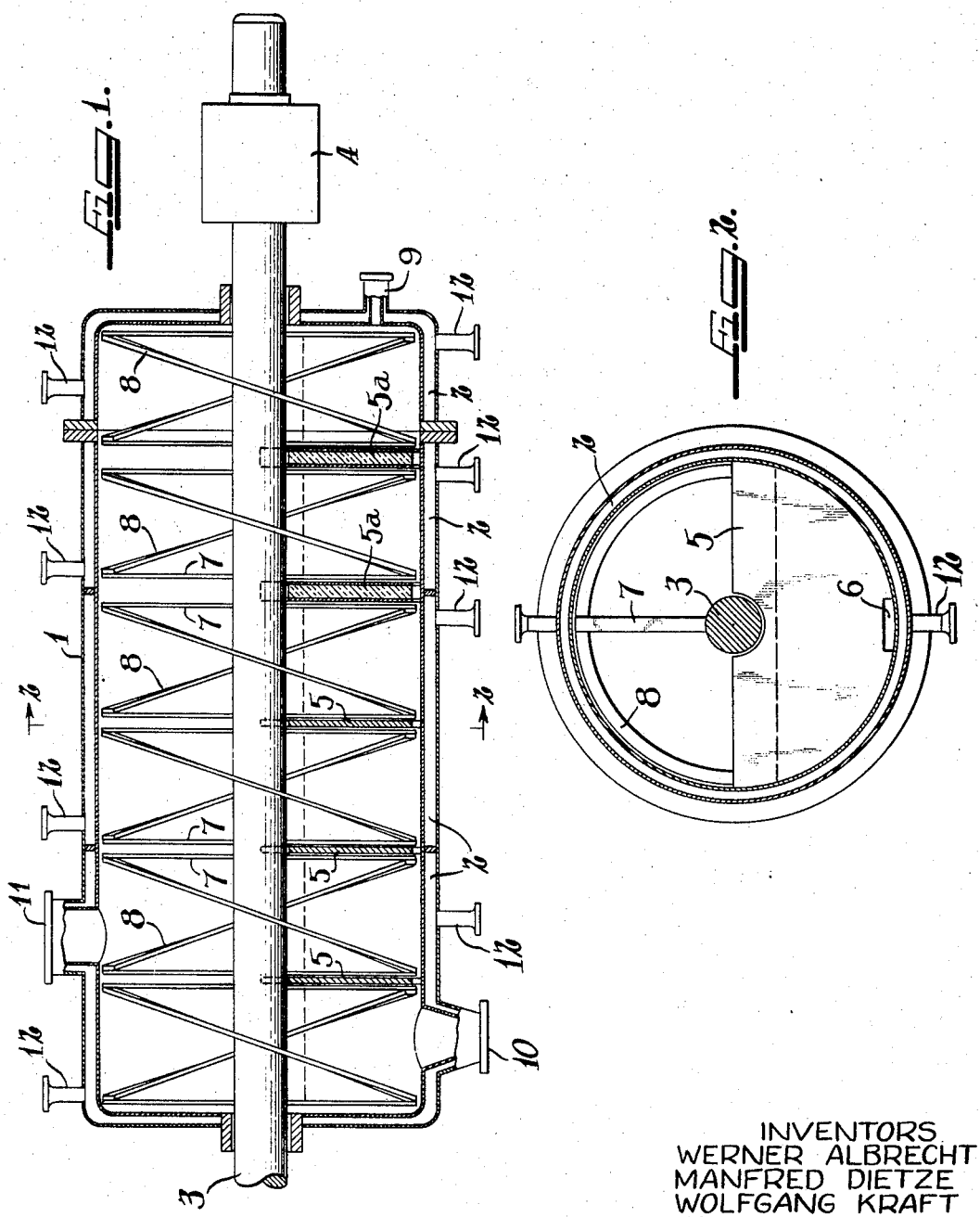
INVENTORS
WERNER ALBRECHT
MANFRED DIETZE
WOLFGANG KRAFT
HANS SCHELLER
HANSJÜRGEN ULLRICH
BY Bair, Freeman & Molinare Attys.

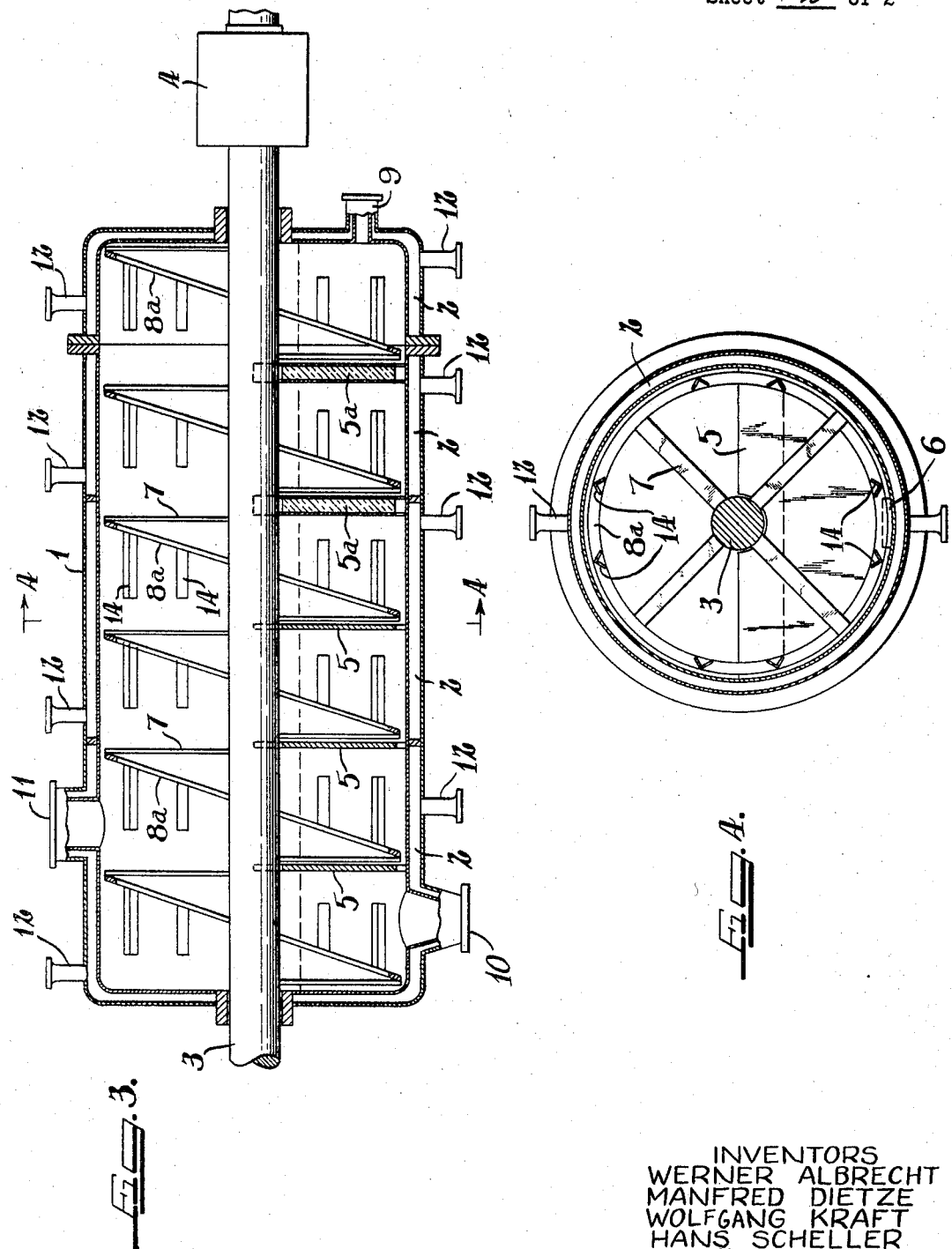

United States Patent Office 3,440,019
Patented Apr. 22, 1969

3,440,019
POLYCONDENSATION REACTOR
Werner Albrecht and Manfred Dietze, Offenbach am Main, Wolfgang Kraft, Bad Vilbel, Hans Scheller, Schonberg, Taunus, and Hansjürgen Ullrich, Frankfurt am Main, Germany, assignors to Vickers-Zimmer Aktiengesellschaft Planung und Bau von Industrieanlagen
Filed June 1, 1965, Ser. No. 460,174
Int. Cl. B01j 1/00
U.S. Cl. 23—285
8 Claims

ABSTRACT OF THE DISCLOSURE

Apparatus for effecting the second stage of polycondensation in making polyesters or polyamides such as polyethylene terephthalate or nylon. The apparatus comprises a horizontally oriented reaction vessel of cylindrical configuration, divided into chamber by vertical, insulated baffle plates. A rotatable shaft extends horizontally through the vessel. Attached to the shaft are helical flights or tumbler rings which agitate polycondensate material as the shaft rotates. Polycondensate pumped from the first polycondensation reactor is heated and transported through the vessel while agitating; vapors such as ethylene glycol are removed through an outlet communicating with a source of reduced pressure. Polycondensate product is drawn off at the bottom of one end of the vessel. The vessel is jacketed along its periphery for temperature control.

---

This invention relates to apparatus for effecting polycondensation to make polyesters or polyamides such as polyethylene terephthalate or nylon, particularly nylon 66. In particular the invention relates to apparatus for effecting the second stage of polycondensation in a polymerization process involving a plurality of condensation stages.

In making polyesters and polyamides for spinning or forming into solid objects, it is essential that the final polymer material prior to spinning or molding be as far as possible of uniform viscosity and composition. It is thus essential that the processes by which the polymers are made be easily and precisely controlled.

There is described in copending application Ser. No. 460,499, filed June 1, 1965, a continuous process for making polyester, in particular polyethylene terephthalate. Therein ethylene glycol is reacted with dimethylterephthalate to produce by transesterification reaction bis-2-hydroxy-ethyl terephthalate. The terephthalate transesterification product is fed into a series of polycondensation reactors each of which effects polycondensation to a higher degree than the reactor preceding it and the reactors are operated at progressively higher temperatures and lower pressures. It is essential that each reactor in the series produce a polycondensate which is nearly uniform in viscosity and composition and that each reactor be easily and precisely controlled. Fluctuations in reaction parameters may result in products which produce unacceptable fibers, films, or cords. It is of particular importance that the first and second polycondensation reactors be precisely controlled since the performance of the subsequent reactor or reactors depends thereon.

There is described in copending application Ser. No. 460,258, filed June 1, 1965, a reactor for effecting the first stage of polycondensation, the reactor comprising essentially a cylindrical reaction chamber and a vertically oriented heat exchanger through which precondensate is recycled while the first stage of condensation occurs. The viscous product of the first reactor is then fed to the second reactor to effect further polycondensation, the second reactor being provided with means to heat and agitate the condensate while removing any gaseous vapors evolved. Temperature and agitation must be controlled precisely to provide a product which is sufficiently condensed and of nearly uniform composition and viscosity to enter a final stage of condensation.

It is thus an object of this invention to provide a process and apparatus for effecting the second stage of a plurality of stages of polycondensation of polyester or polyamide.

It is another object of this invention to provide a process and apparatus for making polyester or polyamide of nearly uniform viscosity and composition.

It is a further object of this invention to provide a second polycondensation reactor to be used in conjunction with a first and a subsequent polycondensation reactor or reactors which second reactor may be easily and precisely controlled.

Other objects of the invention will become more apparent hereinafter as the invention is more fully described.

Basically, the apparatus of the invention comprises a horizontally oriented reaction vessel of generally cylindrical configuration which is divided into a plurality of chambers by vertical insulated baffle plates. Extending horizontally through the vessel is a rotatable shaft to which is attached a plurality of preferably uniformly spaced helical flights or alternatively uniformly spaced tumbler rings which agitate polycondensate material in the vessel as the shaft rotates. When using helical flights, they are so arranged to form two discontinuous helixes which wind from one end of the vessel to the other and such flights aid in transporting material through the vessel as the shaft rotates. Polycondensate pumped from the first polycondensation reactor is heated and transported through the vessel while agitating, vapors such as ethylene glycol being removed therefrom through an outlet communicating with a source of reduced pressure. Polycondensate product is drawn off at the bottom of one end of the vessel. The vessel is jacketed along its periphery for temperature control. The product polycondensate drawn off the second reactor is fed to a third reactor where further condensation occurs. Such third reactor may be as described in copending application Ser. No. 310,705, filed Sept. 23, 1963.

The invention will be better understood by reference to the drawing wherein:

FIGURE 1 is a side view, partially in section, of a reactor embodying the invention;

FIGURE 2 is a view along line 2—2 of FIGURE 1;

FIGURE 3 is a side view, partially in section, of an alternative embodiment of the invention; and FIGURE 4 is a view along line 4—4 of FIGURE 3.

The apparatus of the invention as shown in FIGS. 1 and 3 comprises a horizontally oriented reaction vessel shown generally at 1. Vessel 1 is jacketed along its outer periphery for temperature control. As shown in FIGS. 1 and 3, the jacket comprises a plurality of circumferential bands 2 into which heating fluid is pumped through pipes 12, two pipes being provided for each band, one as an inlet, the other a fluid outlet. Any conventional heat exchange fluid such as liquid or vaporous diphenyl may be used. Vessel 1 may be maintained at one temperature by proper control of the jackets 2 of the temperature along the horizontal axis of vessel 1 may be varied by controlling the temperature in the various bands 2. E.g., in making polyethylene terephthalate, it is advantageous to control the vessel temperature so that the temperature increases along the flow path of polycondensate, i.e., from right to left as shown in FIGS. 1 and 3.

Along the central horizontal axis of vessel 1 is shaft 3 which is connected through conventional seals and bearings to a motor 4, shown diagrammatically. The motor is of any conventional type, preferably an A.C. motor, and may be located at either end of vessel 1. As shown in FIG. 1, shaft 3 is rotated so as to urge material in vessel 1 from right to left.

Vessel 1 is divided into a plurality of chambers by baffle plates 5 which can be insulated as partly shown in FIGS. 1 and 3 in plates 5a to reduce heat transfer between chambers in order to get a distinct change of temperature from chamber to chamber. Plates 5 and 5a are secured to the interior of vessel 1 by any conventional means such as welding. Each baffle plate 5 and 5a has at its lower portion an aperture, shown in FIG. 2 as an elongated slot 6, through which the viscous polycondensate material flows. The apertures may be staggered with respect to each other so as to lengthen the path of liquid flow to a tortuous path from plate to plate. Plates 5 and 5a terminate in the upper portion of vessel 1 as best seen in FIGS. 2 and 4 so that the portion of vessel 1 above baffle plates 5 and 5a is a common manifold for collection of vaporous material.

Insulated baffle plates 5a consist of metallic outer walls such as stainless steel between which is inserted any conventional insulating material such as glass fiber. The thickness of the plates will depend upon the nature of the insulating material used and temperature drop desired between chambers. It should be understood that all baffle plates may be insulated as illustrated by plates 5a in FIGS. 1 and 3 or only a portion may be insulated depending upon the requirements of the reaction to be effected.

Attached to shaft 3 are a plurality of struts 7 which project radially from shaft 3 to the periphery of vessel 1. In the embodiment shown in FIG. 1, helical spiral members 8 are attached to the struts and form two discontinuous helixes along the horizontal axis of vessel 1. In the embodiment of FIG. 3, tumbler rings 8a are attached to the struts. To the periphery of rings 8a may be attached agitator arms 14 which as shown in FIG. 4 are elongated rods of triangular cross-section. Arms 14 may alternatively be of square or rectangular cross-section and are secured to arms 8a by any suitable means preferably by welding. Agitator arms may also be attached to the periphery of the helical flight as shown in FIG. 1 as well as the tumbler rings. In FIG. 4, shaft 3 is shown rotated 45° from its position in FIG. 3 to illustrate more clearly the positional relation of the top of baffle plates 5 and struts 7.

Regardless of whether helical flights or tumbler rings are employed, they are so arranged in proximity to the inner surface of the vessel to prevent polycondensate accumulation or sedimentation in the vessel walls. I.e., the flights or rings have a scraping effect to keep the walls substantially clear of condensate.

Vessel 1 is further provided with an inlet pipe 9 through which polycondensate from a first polycondensation reactor is fed. There is also provided a product outlet line 10 through which the product is withdrawn, e.g., by means of a suitable screw device well known in the art. Through pipe 11 vaporous products such as ethylene glycol are withdrawn from the reaction vessel. Outlet 11 is connected to a source of reduced pressure so that vessel 1 is maintained at reduced pressure.

In operation, polycondensate from a first polycondensation reactor is fed into inlet 9 and is maintained in vessel 1 at a level lower than the top of baffle 5, as shown in the drawings. Shaft 3 is rotated so that helical flights 8 or rings 8a agitate viscous polycondensate material while the latter moves from one chamber to the next through ports 6 of each baffle plate 5. As shown in FIGS. 1 and 3, material moves from right to left through vessel 1. When helical flights are used, movement of the flights assists the transportation of the viscous material from chamber to chamber and promotes further polycondensation and evolution of ethylene glycol. As polycondensate product moves through the reactor, gaseous products such as ethylene glycol are removed through port 11. By varying the rotation rate of shaft 3 and the level of liquid material in vessel 1, the residence time of the polycondensate can be varied. In addition, the temperature in jacket 2 may be varied thus making it possible to control the temperature of the polycondensate.

In making polyethylene terephthalate, feed material which enters vessel 1 is a partially condensed polyethylene terephthalate which is the product of a first polycondensation reactor as described in copending application Ser. No. 460,258 filed June 1, 1965. The reaction vessel 1 is maintained preferably at between about 260 and 280° C. and between about 1 and 20 torr, preferably about 3 torr. During the reaction, vaporous ethylene glycol is removed from vessel 1 through port 11. Residence time in vessel 1 is about 2 to 6 hours, preferably about 3 hours. Shaft 3 is rotated at between 20 and 60 r.p.m., preferably about 40 r.p.m.

The following examples illustrate the process of the invention. The examples are to be construed as illustrative only and not limiting the scope of the invention.

Example I

A polycondensate material of polyethylene terephthalate having viscosity of 0.14 ($\eta_{intr}$) and degree of polymerization of about 10 was employed as feed material to a second reactor as shown in FIG. 1. The feed material was the product of a first polycondensation reaction as described in copending application Ser. No. 460,258, filed June 1, 1965, wherein there was polymerized bis - 2 - hydroxy - ethyl terephthlate in the presence of a suitable catalyst, for example antimony trioxide. The bis-2-hydroxy-ethyl terephthalate was prepared by the transesterification of dimethylterephthalate and ethylene glycol in the presence of a suitable catalyst, for example zinc acetate.

The polycondensate was fed to the second reactor at 135 kg./hr. Liquid volume was maintained at 340 liters and the temperature at the reactor inlet was 260° C. The shaft was rotated at 33 r.p.m. and polycondensate transported through the reactor, the residence time of fluid material being 3.4 hours. The reactor vessel was maintained at 3 torr and ethylene glycol was removed as vapor at the rate of 4 kg./hr.

Product polycondensate was withdrawn from the vessel at a temperature of 275° C. The product had a viscosity of 0.45 ($\eta_{intr}$) and a degree of polymerization of about 51.

Example II

A polycondensate material of polyethylene terephthalate having viscosity of 0.18 ($\eta_{intr}$) and degree of polymerization of about 15 was employed as feed material to a second reactor as shown in FIG. 1. The feed material was the product of a first polycondensation reaction as described in copending application Ser. No. 460,258, filed June 1, 1965, wherein there was polymerized bis-2-hydroxy-ethyl terephthalate in the presence of a suitable catalyst, for example antimony trioxide. The bis-2-hydroxy-ethyl terephthalate was prepared by the transesterification of dimethylterephthalate and ethylene glycol in the presence of a suitable catalyst, for example zinc acetate.

The polycondensate was fed to the second reactor at 4.3 kg./hr. Liquid volume was maintained at 12 liters and the temperature at the reactor inlet was 265° C. The shaft was rotated at 44 r.p.m. and polycondensate transported through the reactor, the residence time of fluid material being 3.4 hours. The reactor vessel was maintained at 2 torr and ethylene glycol was removed as vapor at the rate of 0.125 kg./hr.

Product polycondensate was withdrawn from the vessel at a temperature of 275° C. The product had a viscosity of 0.52 ($\eta_{inrt}$) and a degree of polymerization of about 71.

Example III

A polycondensate material of polyethylene terephthalate having viscosity of 0.14 ($\eta_{intr}$) and degree of polymerization of about 10 was employed as feed material to a second reactor as shown in FIG. 1. The feed material was the product of a first polycondensation reaction as described in copending application Ser. No. 460,258, filed June 1, 1965, wherein there was polymerized bis-2-hydroxy-ethyl terephthalate in the presence of a suitable catalyst, for example antimony trioxide. The bis-2-hydroxyethyl terephthalate was prepared by the transesterification of dimethylterephthalate and ethylene glycol in the presence of a suitable catalyst, for example zinc acetate.

The polycondensate was fed to the second reactor at 375 kg./hr. Liquid volume was maintained at 1240 liters and the temperature at the reactor inlet was 265° C. The shaft was rotated at 33 r.p.m. and polycondensate transported through the reactor, the residence time of fluid material being 4 hours. The reactor vessel was maintained at 2 torr and ethylene glycol was removed as vapor at the rate of 12 kg./hr.

Product polycondensate was withdrawn from the vessel at a temperature of 275° C. The product had a viscosity of 0.47 ($\eta_{intr}$) and a degree of polymerization of about 62.

As can be seen, the apparatus and method of this invention provides a simple and easy means for effecting further polycondensation of partially condensed precondensates. What has heretofore been described is but one embodiment of the invention which is non-limitative, the scope of the invention being defined by the following claims.

We claim:

1. Apparatus for polymerizing liquid polycondensate comprising a reaction vessel having an upper and lower portion, means dividing said lower portion into a plurality of horizontally disposed chambers, apertures in said means adapted to permit flow of fluid therethrough, a rotatable shaft horizontally disposed in said vessel, a plurality of flights secured to said shaft equally spaced at points along the internal circumference of said vessel, means in said lower portion for feeding liquid polycondensate into said vessel, means in said lower portion for withdrawing liquid from said vessel and means in said upper section for communicating with a source of reduced pressure to remove vapors from said vessel.

2. Apparatus of claim 1 wherein the means for dividing said lower portion into chambers is a plurality of substantially vertical baffle plates through which said shaft extends, each plate having at its bottom an aperture to permit flow of liquid therethrough.

3. Apparatus of claim 2 wherein said plates are insulated.

4. Apparatus of claim 1 wherein said spaced flights form two discontinuous helixes through said vessel, each flight element being of semi-circular configuration.

5. Apparatus of claim 1 wherein said vessel is jacketed around its external periphery for temperature control by heating fluid.

6. Apparatus of claim 5 wherein said jacket is divided into a plurality of independently controllable sections.

7. Apparatus of claim 1 wherein said flights are circular rings arranged in planes parallel to each other and inclined to the plane perpendicular to said shaft.

8. Apparatus of claim 7 wherein said rings have attached to their periphery a plurality of agitator arms.

References Cited

UNITED STATES PATENTS

| | | | |
|---|---|---|---|
| 2,626,856 | 1/1953 | Allen | 23—285 XR |
| 3,118,739 | 1/1964 | Atkinson et al. | 23—285 |
| 3,343,922 | 9/1967 | Zimmer et al. | 23—285 |
| 3,377,139 | 4/1968 | MacGregor et al. | 23—285 |

MORRIS O. WOLK, Primary Examiner.

M. D. BURNS, Assistant Examiner.

U.S. Cl. X.R.

23—288; 260—75